(12) United States Patent
Melo et al.

(10) Patent No.: US 11,010,456 B2
(45) Date of Patent: *May 18, 2021

(54) INFORMATION ACCESS IN A GRAPH DATABASE

(71) Applicant: ADP, LLC, Roseland, NJ (US)

(72) Inventors: Jason F. Melo, Hastings-on-Hudson, NJ (US); Michael Hirawady, Florham Park, NJ (US); Kuntal Roy, North Brunswick, NJ (US); Meng-Yi Hsu, New York, NY (US); Lucky Ratanlal Jain, Jersey City, NJ (US); Dennis Peter Mohan, Merrick, NY (US); Shia Kaufman, Long Island City, NY (US)

(73) Assignee: ADP, LLC, Roseland, NJ (US)

( * ) Notice: Subject to any disclaimer, the term of this patent is extended or adjusted under 35 U.S.C. 154(b) by 347 days.

This patent is subject to a terminal disclaimer.

(21) Appl. No.: 15/955,092

(22) Filed: Apr. 17, 2018

(65) Prior Publication Data

US 2019/0318068 A1    Oct. 17, 2019

(51) Int. Cl.
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 6,782,415 B1 | 8/2004 | Quine | |
| 7,117,165 B1 | 10/2006 | Adams et al. | |
| 7,395,316 B2 | 7/2008 | Ostertag et al. | |
| 8,504,653 B1 * | 8/2013 | Commons | H04L 67/1097 709/217 |
| 10,235,533 B1 * | 3/2019 | Thoren | G06F 21/6218 |
| 10,353,686 B1 | 7/2019 | Pasha et al. | |
| 2001/0051906 A1 | 12/2001 | Esposito | |
| 2002/0082894 A1 | 6/2002 | Azuma | |
| 2002/0161766 A1 | 10/2002 | Lawson et al. | |
| 2003/0069749 A1 | 4/2003 | Shear et al. | |
| 2004/0254937 A1 | 12/2004 | Gemold | |
| 2006/0095466 A1 | 5/2006 | Stevens et al. | |

(Continued)

OTHER PUBLICATIONS

Office Action regarding U.S. Appl. No. 15/955,600, dated May 14, 2020, 23 pages.

(Continued)

*Primary Examiner* — Mark D Featherstone
*Assistant Examiner* — Samuel C Sharpless, III
(74) *Attorney, Agent, or Firm* — Yee & Associates, P.C.

(57) ABSTRACT

A computer-implemented method of improving data access in an organization by a computer. The computer receives a command from an individual to perform an action on a data element to the organization. Responsive to receiving the command, the computer reads an authorization object assigned to the data element. Responsive to reading the authorization object, the computer creates list of individuals authorized to perform the action on the data element in accordance with the authorization object. Responsive to creating the list, the computer permits the action on the data element only if the individual is on the list.

24 Claims, 7 Drawing Sheets

(56) References Cited

U.S. PATENT DOCUMENTS

| | | |
|---|---|---|
| 2008/0098484 A1 | 4/2008 | Cicchitto et al. |
| 2009/0320088 A1 | 12/2009 | Gill et al. |
| 2012/0166323 A1 | 6/2012 | Guo |
| 2014/0250062 A1* | 9/2014 | Vroom .................. G06F 16/252 707/618 |
| 2016/0057151 A1* | 2/2016 | Brock .................... H04L 67/02 726/4 |
| 2016/0110412 A1 | 4/2016 | Sun et al. |
| 2016/0203327 A1* | 7/2016 | Akkiraju ............ G06F 21/6218 707/785 |
| 2016/0371352 A1* | 12/2016 | Kohlmeier .......... G06F 16/9024 |
| 2018/0239959 A1 | 8/2018 | Bui et al. |
| 2019/0057064 A1 | 2/2019 | Bonk et al. |
| 2019/0095446 A1* | 3/2019 | Laeuchli ............. G06F 16/9024 |
| 2019/0287106 A1 | 9/2019 | Sadeddin et al. |
| 2019/0317819 A1 | 10/2019 | Brown et al. |
| 2019/0318005 A1 | 10/2019 | Hirawady et al. |

OTHER PUBLICATIONS

Office Action regarding U.S. Appl. No. 15/955,562, dated Oct. 15, 2019; 21 pages.
Final Office Action regarding U.S. Appl. No. 15/955,562, dated Apr. 22, 2020; 22 pages.
Notice of Allowance regarding U.S. Appl. No. 15/955,562, dated Aug. 11, 2020; 13 pages.
Final Office Action regarding U.S. Appl. No. 15/955,600, dated Sep. 16, 2020, 18 pages.
Office Action regarding U.S. Appl. No. 15/955,600, dated Dec. 30, 2020, 27 pages.

* cited by examiner

INFORMATION ACCESS IN A GRAPH DATABASE

BACKGROUND INFORMATION

1. Field

The present disclosure relates to computer-implemented document access control in an organization using graph databases and, in particular, to accessing information and performing actions thereon based on a list generated from a graph database using an authorization object linked with the document.

2. Background

As used herein, databases store information exclusively in computers. A graph database is a specific type of database. The graph database has a graph structure including nodes, edges, and properties which represent and store data. Nodes store data. Properties are information that relate to nodes. Edges represent relationships among nodes; that is, the edges directly relate nodes to each other. Graph databases, by design, allow for retrieval of complex hierarchical structures.

Organizations have large amounts of data available to employees. Controlling employee access to each item of information can be both costly and counterproductive. A need exists for a way to control access to information in an organization only to those people who are permitted to access the information.

SUMMARY

The illustrative embodiments provide for a computer-implemented method of improving data access control in an organization by a computer, the method comprising: receiving, by the computer, a command to perform an action on a data element the organization; responsive to receiving the command, reading an authorization object assigned to the data element; responsive to reading the authorization object, creating a list of individuals in accordance with the authorization object; and responsive to creating the list, automatically performing the action, by the computer, on the data element only if the action is a permitted action performed by an actor authorized to perform the action.

The illustrative embodiments also contemplate a computer configured to execute program code which implements this method. The illustrative embodiments also contemplate a non-transitory computer recordable storage medium storing program code, which, when executed, implements this method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
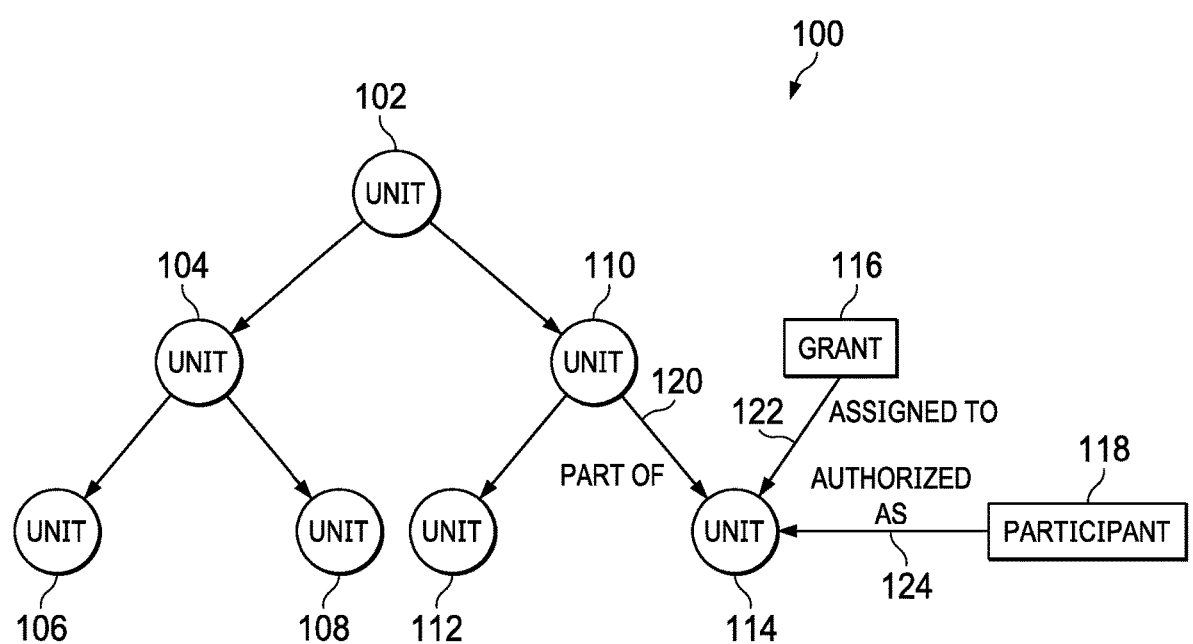
FIG. 1 is an illustration of a diagram of a novel graph database design in accordance with an illustrative embodiment.

The illustrative embodiments recognize and take into account that an organization has information that is available to different members of the organization. The types of information may vary in regard to who has a need to access the information. If all information is available to each and every person in the organization, a number of problems may arise.

The illustrative embodiments recognize and take into account that security and confidentiality considerations may demand that some documents are not accessible to all employees. Indeed, some documents may require access and manipulation only to selected employees such as managers or employees assigned to a work unit engaged in highly sensitive areas.

The illustrative embodiments recognize and take into account that a flexible graph database provides for dynamic data relationships that create a mechanism to dynamically define new and existing relationships via metadata. The flexible graph database may dynamically adjust a node's relationship to another node based on the node's property value. A flexible graph database may have advantages in identifying individuals to access or edit certain data elements and to prevent unauthorized actions on documents and data elements to those employees that have no need for the documents.

The illustrative embodiments recognize and take into account that a flexible graph database may have relationship metadata updates that are automatically consumed by the graph database. The flexible graph database may then update itself accordingly using rules in the metadata. In addition, this mechanism may allow a node to be linked to another node in the graph database dynamically based on a node's property value. If the value changes, then the linkage between the nodes will be updated.

The illustrative embodiments recognize and take into account that a flexible graph database may define relationships based on attributes of the nodes. Such relationships based on attributes and the nodes may be encapsulated in an authorization object linked with an access-controlled document of the organization. In this manner, the illustrative embodiments that an object linked with an access-controlled document may be used to generate a list of recipients provided by a traversal of a flexible graph database in which only persons needing the document may be identified.

The illustrative embodiments recognize and take into account that a flexible graph database may provide dynamic assignments of nodes based on metadata linked with the nodes and that metadata may be stored in an object linked with a document to be accessed. Furthermore, a graph database reactor may listen to changes so that an attribute or a metadata change in the object linked with the document may trigger a change in the composition of the object so that a list of employees generated by the object will be current. For example, a change in a role of a particular employee triggers a reassessment of grants to the employee, therefore granting the employee updated document authorization access in near real-time.

As used herein, the term "unit" refers to a fundamental grouping of participants and/or grants within the structure. As an example, an employee role may be a unit. The employee role (unit) may be a grouping of associates (participants) who are employees of a company in a human resources structure. The term "role unit" consequently refers to a grouping of participants within the structure based upon an employee role in a company. As an example, an employee in a particular position may be authorized as a member of a role unit.

As used herein, the term "participant" is data that represents a type of actor in the structure that has a relationship to a unit. The relationship can be direct or indirect. As an example, an associate may belong to a role unit indirectly via a position held by the associate.

As used herein, the term "actor" is an entity that is authenticated and can interact with the graph database platform. As an example, an actor may be a user. The user (actor) may be an authenticated employee represented in a human resources structure of a company.

As used herein, an "entity" is a set of data that defines an object, a person, or properties or relationships of the object or person. A unit may be composed of entities. An entity may be a unit in some instances, or may be a sub-unit in other instances.

As used herein, the term "attribute" is a piece of information that determines a property of an actor. As an example, a position of an associate in a company is an attribute of the associate. Consequently, an actor attribute is an attribute of an actor in the system. For example, one or more of a position of an actor in the company, the department of the company to which the actor belongs, and other appropriate information may be an actor attribute.

As used herein, the term "element" is a bounded piece of the system that an actor needs to access when performing an associated action in the system. For example, a compensation information file, a button to edit an employee's information, an employee Social Security Number, and a workflow to approve expenses may be elements. Access to an element may be restricted by one or more element constraints.

As used herein, the term "element constraint" is a restricting condition placed on an element in a system, which limits an actor from accessing the element. The element constraint can be based on an attribute of the actor. For example, access to an employee's compensation record may be conditionally restricted to an actor's own compensation information or to the direct reports of an actor.

As used herein, the term "action" is an activity that can be performed to an element by an actor. For example, an action can be one or more of viewing an element, saving an element, submitting an element, deleting an element, and other appropriate activities that can be performed to an element may be an action.

As used herein, the term "permission" is a rule that defines what action can be performed to an element. For example, a rule may permit an actor to view compensation information tile. In another example, a rule may permit an actor to update compensation information Shape. A "permission object" includes an action and an element on which the action is performed.

As used herein, the term "relationship type" refers to a property between two objects in the structure that defines the relationship itself. For example, a grant has an "assigned to" relationship type with a unit. In another example, a unit may have a "part of" relationship type with another unit.

As used herein, the term "grant" refers to an object that has a relationship to a unit and is applied to all of the participants of the unit. A grant object includes a set of permissions and a set of element constraints. As an example, a rule may permit an actor to view compensation information tile and update compensation information Shape, conditionally restricted to information for the direct reports of an actor. As used herein, the term "unassigned grant" is a grant that is not associated with a role unit.

Grants may be assigned to a role unit and applied to all associates in the role. As used herein, the term "assigned grant" is an assignment of one or more grants to an actor. The assignment can be based on an actor attribute. As an example, an employee may be authorized to view compensation information, but the action is constrained to the employee's own compensation information. In another example, a manager may be permitted to view and update the compensation information, but those actions are constrained to the direct reports of the manager.

As an example, an assigned grant to a role unit may be defined by an authorization object and an element constraint. The assigned grant therefore may permit an action on an element by all or part of the role unit, as limited by the element constraint. An authorization object is an element that links an assigned grant to a role unit. As used herein, "authorizations" are further defined as an assigned grant to a role unit. Therefore, an assigned grant creates relationship between the permission object and the associated role unit that is applied to all of the participants of the role unit. Elements on which participants of the role unit can perform actions permitted by the grant are conditionally restricted by the element constraint.

As used herein, an "authorization structure" may be a flexible graph structure defining an authorization group structure. As used herein, "authorization groups" are defined as participants of a criteria-based unit in the structure.

FIG. 1 is an illustration of a block diagram of a novel graph database design in accordance with an illustrative embodiment. Structure 100 is an example of the novel graph databases described here and elsewhere herein. Structure 100 is stored solely on a non-transitory computer recordable storage medium and only maintained by a computer. Thus, the illustrative embodiments improve data access control on a computer, both in terms of the kind and quality of data that can be access-restricted. The illustrative embodiments also provide for automatic maintenance of the access authorization list by the computer.

In order to better understand structure 100, certain terms are now defined. As used herein, the term "structure" refers to a construct that maintains and defines relationships between units. Structure 100 may be considered an improvement of a graph database. Structure 100 may store information about a particular organization. For example, a structure could be a legal structure, a cost center structure, a human resources structure, a role structure, or others. Stated succinctly, structure 100 is a collection of units, participants, and grants with defined relationships between one another. A structure may be, but does not have to be, hierarchical in structure.

As used herein, the term "practitioner group" refers to a fundamental grouping of participants within the structure based upon practitioner type. As an example, an employee may be assigned to a number of employee authorization grants and may be authorized as a role in a particular position.

As used herein, an "authorization structure" may be a flexible graph structure defining a role for a practitioner group. An "authorization object" may be an object assigned to a document that links a practitioner group to at least one grant and at least one criteria-based node.

As used herein, "responsibility groups" are defined as participants of a criteria-based unit in the structure.

Returning to FIG. 1, structure 100 includes units, such as unit 102, unit 104, unit 106, unit 108, unit 110, unit 112, and unit 114. More or different units may be present and the units may have different relationships than those shown. Units, grants, and participants are objects in structure 100 and are akin to nodes in a typical graph database. However, unlike typical graph databases, objects in structure 100 have other properties such as metadata, and may be of completely new types such as grants and participants. Thus, for example, grant 116 and participant 118 are types of objects.

FIG. 1 also shows edges, as indicated by the various arrows between objects, including grant 116 and participant 118. Edges depict relationships between the nodes and have labels. For example, edge 120 has a label "part of," edge 122 has a label "assigned to," and edge 124 has a label "authorized as." These edges define the relationship of unit 110 to unit 114, of grant 116 to unit 114, and participant 118 to unit 114.

Structure 100 observes certain ground rules. For example, unit-to-unit relationships are always at least a "part of" relationship. In another example, grant-to-unit relationships are always at least an "assigned to" relationship. In another example, relationships between nodes may be bi-directional. Thus, for example, a grant-to-unit and a unit-to-grant relationship are both valid.

Participant 118 is a type of unit that typically represents an actor. Participant 118 may be directly related to a unit (an employee, for example) or may be indirectly related to a unit (an associate via their position is related to a human resources unit, for example). In this scenario, the position is the direct participant, but the actor is the employee.

The types of grants can be different depending on the structure. For example, an authorization grant may be related to a role structure. A time-off grant may be related to a work structure.

Figure 2:
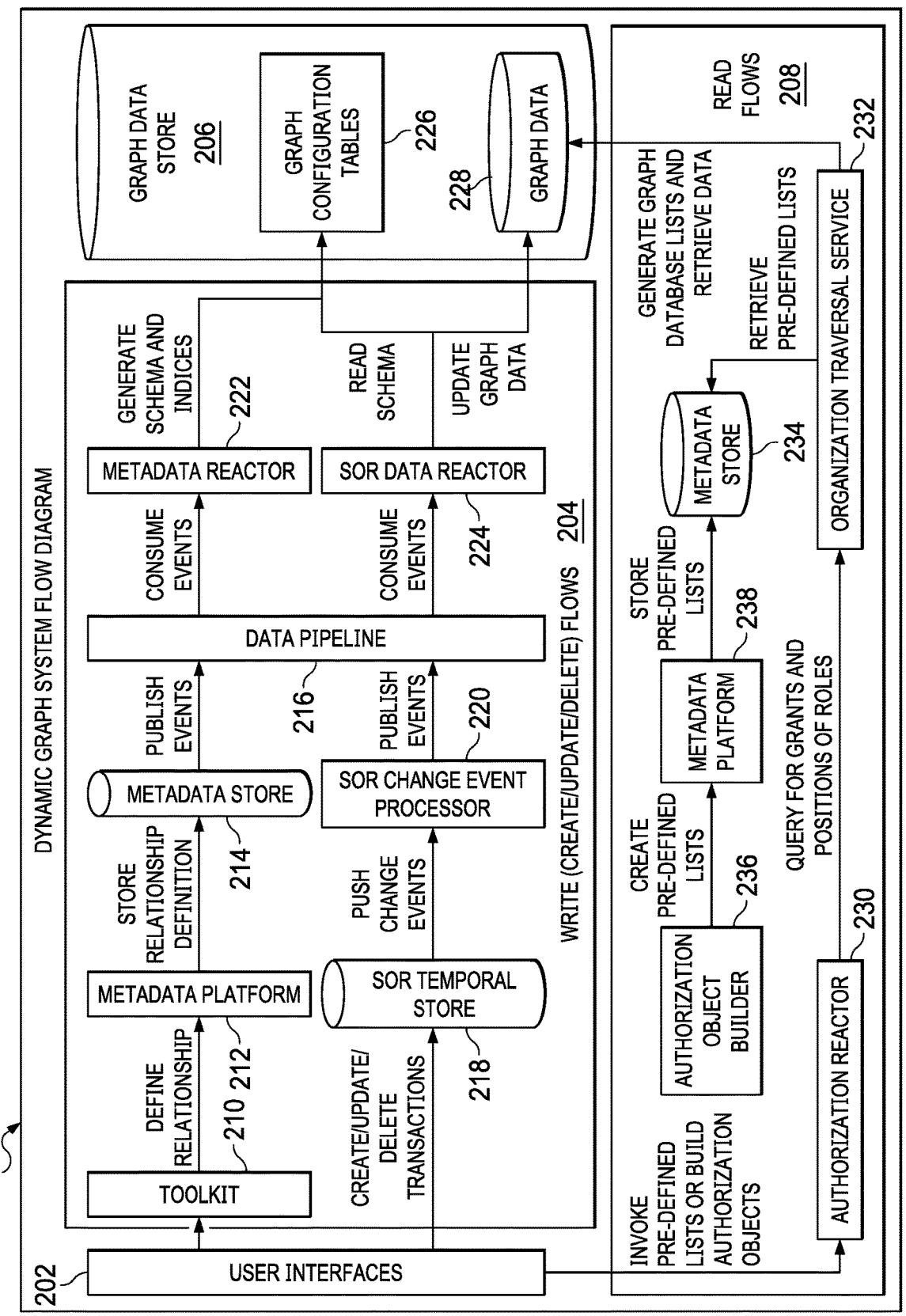
FIG. 2 is an illustration of a block diagram of a specific example of a novel graph database design with an authorization object builder in accordance with an illustrative embodiment.

FIG. 2 depicts an illustration of a block diagram of a graph database system in accordance with an illustrative embodiment. Block diagram 200 may be characterized as a dynamic graph system flow diagram. Block diagram 200 shows both systems and actions in the design and operation of a structure, such as structure 100 as defined above and shown in FIG. 1.

Block diagram 200 includes four main sections: user interfaces 202, write flows 204, graph data store 206, and read flows 208. User interfaces 202 may be typical user interfaces, such as a keyboard, a mouse, a graphical user interface (a physical display), a touch screen, a voice interaction, and any other suitable interface for interacting with the computer. User interfaces 202 receive user input, including design of structure traversals, design of the structure, and/or data input, and/or metadata input. User interfaces 202 are used to create flows, that is create, update, and delete flows, as shown in write flows 204. In turn, flows interact with graph data store 206 for the storage and manipulation of the structure. Graph data store 206 in turn is also accessed by user interfaces 202 via read flows 208.

Figure 3:
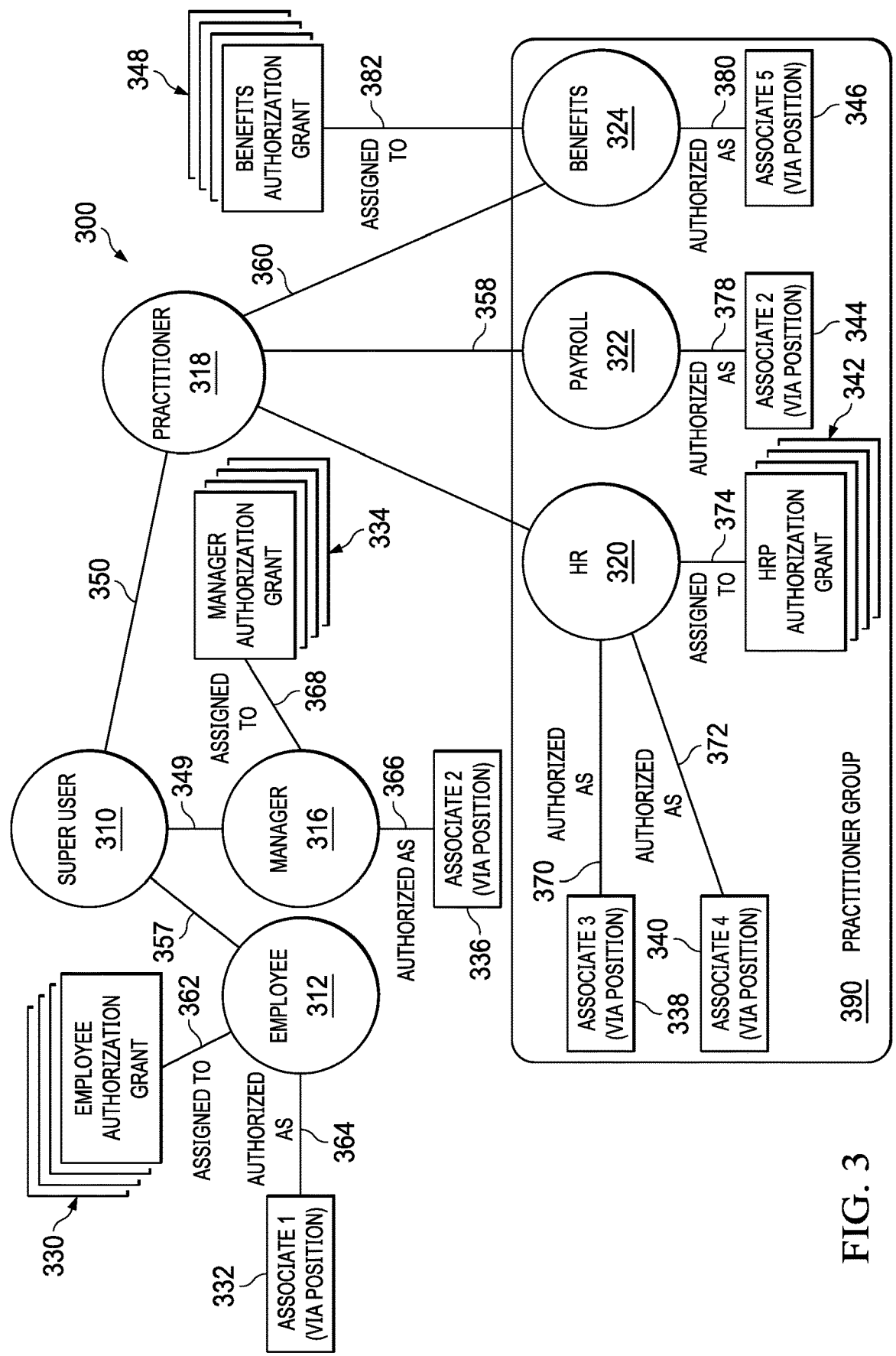
FIG. 3 is an illustration of a diagram of a role structure defining practitioner types in a data processing system in accordance with an illustrative embodiment.
Figure 4:
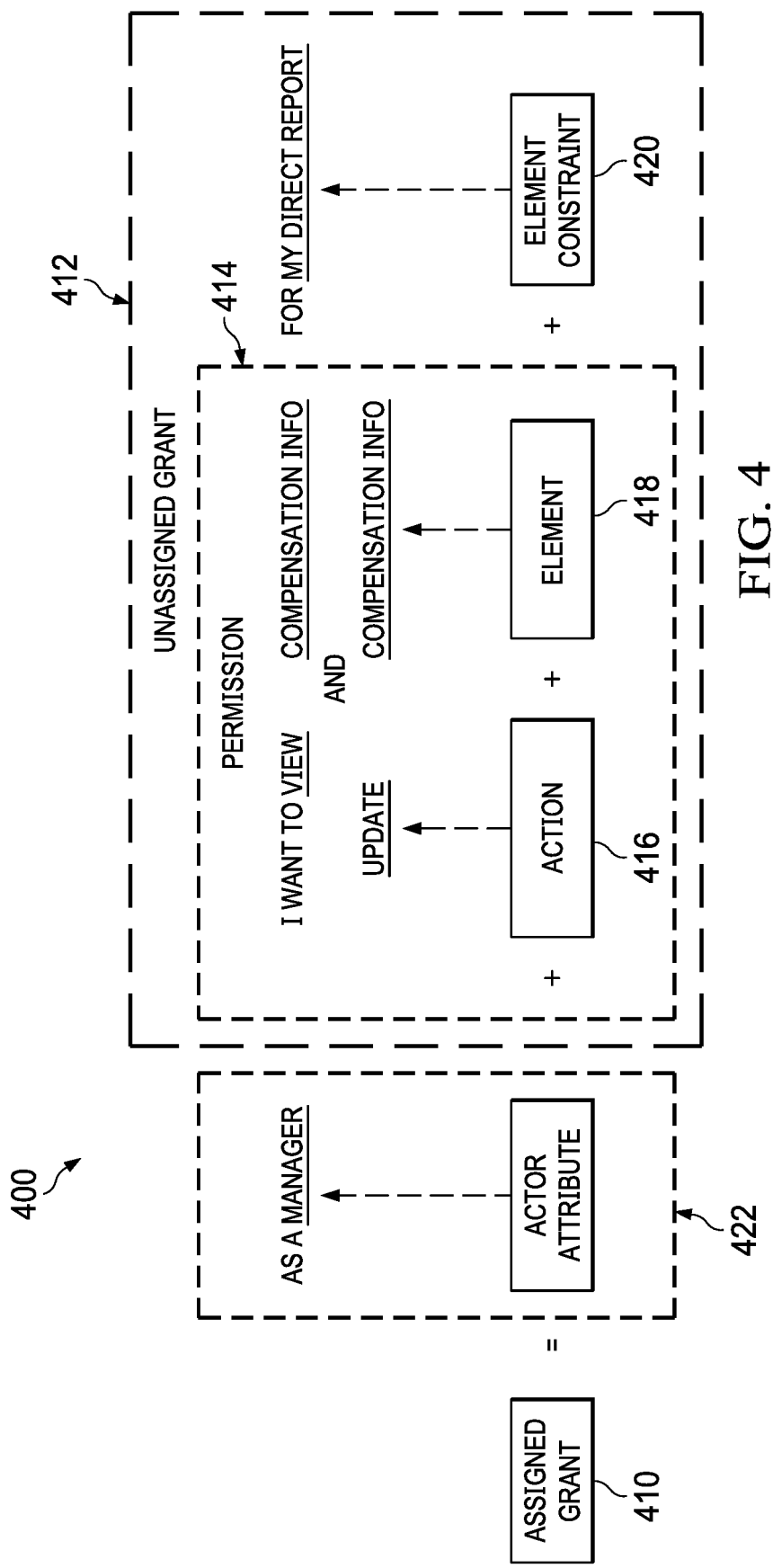
FIG. 4 is an illustration of a diagram of an authorization policy structure in a data processing system in accordance with an illustrative embodiment.

For write flows 204, user interfaces 202 interact with graph relationship designer toolkit 210. Examples of user interfaces for such a toolkit are shown in FIG. 3 and FIG. 4. Graph relationship designer toolkit 210 defines relationships among units in the structure. Graph relationship designer toolkit 210 assigns grants and positions to role units in the structure. Write flows 204 also includes metadata platform 212. Metadata platform 212 stores relationship definitions to metadata store 214. In turn, metadata store 214 publishes events to data pipeline 216.

Additionally, for write flows 204, user interfaces 202 also is used to create, update, and/or delete transactions for the various units in the structure to SOR temporal store 218. Again, SOR stands for "system of record." In turn, SOR temporal store 218 pushes change events to SOR change event processor 220, which may be software executed by hardware or may be hardware alone. Like metadata store 214, SOR change event processor 220 publishes events that it generates to data pipeline 216.

Whatever events are published, data pipeline 216 consumes events and provides them to metadata reactor 222 and SOR data reactor 224. Reactors are software programs, or hardware alone, which are programmed to take action in response to events or actions of reactors. Metadata reactor 222 generates schema and indices, and provides them to graph configuration tables 226 in graph data store 206.

The front-end drag and drop designer application, such as described above, generates metadata that defines the relationship (two nodes and an edge) that will be used to form the graph. For example, relationships can include Associate Occupies Position or Grants Assigned to Unit. The metadata reactor consumes this relationship metadata and converts it into a proper graph database schema and custom indices. These results will be used by the SOR data reactor to build and maintain the graph data.

SOR data reactor 224 reads schema and provides the result to graph configuration tables 226. SOR data reactor 224 also updates graph data and stores updates in graph data 228. Once metadata reactor 222 generates the graph schema, SOR data reactor 224 will start listening to the relevant SOR change events and maintain the graph data as needed. For example, if there is a new record for an associate being created in SOR, that event will trigger a message to the SOR reactor. The SOR reactor will understand that a new associate's record has just been created, and it will build the "Associate Occupies Position" relationship and link that relationship to its proper place in the graph.

Attention is now turned to read flows 208. Again, actions generated through user interfaces 202 are used to invoke pre-defined authorizations or to dynamically authorize actions by a user. Organization traversal service 232 reads data from graph data 228. Authorization reactor 230 queries organization traversal service 232 for grants and positions assigned to various role units. Authorization reactor 230 assigns grants to role units. The assigned grants are provided to metadata store 234, acting as a runtime authorization storage. Grants are provided to authorization reactor 230. In turn, organization traversal service 232 accesses metadata store 234, which may be the same or different than metadata store 214 from write flows 204. Organization traversal service 232 retrieves assigned grants by authorization reactor 230.

In addition, when a user desires to access a particular data element, organization traversal service 232 may be used to determine whether the action by the actor is permitted on the particular data element. Metadata platform 238 in turn may store pre-defined lists which are provided to metadata store 234 by authorization object builder 236. When an event is consumed, SOR data reactor 224 queries metadata store 234 to determine whether the action is permitted by the actor. SOR data reactor 224 updates graph data 228 only if the action is permitted by an assigned grant.

Returning to organization traversal service 232, this service generates lists based on authorization objects and retrieves data to and from graph data 228. Retrieved data and/or query results are stored, provided to a user via user interfaces 202, or both, in a manner similar to that described above.

FIG. 3 is an illustration of a diagram of a role structure defining practitioner types in a data processing system in accordance with an illustrative embodiment. Structure 300 may be a role structure defining practitioner types. Super user node 310 may be connected to employee node 312 by edge 357, to manager node 316 by edge 349, and to practitioner node 318 by edge 350.

Employee node 312 may be connected to a number of employee authorization grant 330 by "assigned to" edge 362 and to "Associate 1" by "authorized as" edge 364. Manager node 316 may be connected to manager authorization grant 334 by "assigned to" edge 368 and to "Associate 2" by "authorized to" edge 366. Practitioner node 318 may be connected to a number of practitioner types. In the illustrative example, the following types are shown: human resources (HR) 320, payroll 322, and benefits 324.

A practitioner group may be formed such as practitioner group 390 comprising human resources 320, payroll 322, and benefits 324. Within practitioner group 390, human resources may be connected to "Associate 3" 338 by "authorized as" edge 370, to "Associate 4" 340 by "authorized as" edge 372, and to a number of HRP authorization grant 342 by "assigned to" edge 374. Payroll 322 may be connected to "Associate 2" 344 by "authorized as" edge 378. Benefits 324 may be connected to "Associate 5" 346 by "authorized as" edge 380 and to a number of benefits authorization grant 348 by "assigned to" edge 382.

FIG. 4 is an illustration of an authorization policy structure in a data processing system depicted in accordance with an illustrative embodiment. In the illustrative embodiment, authorization structure 400 creates assigned grant 410 when unassigned grant 412 is associated with a role unit. Unassigned grant 412 comprises permission object 414 that links action 416 with element 418. Unassigned grant 412 includes element constraint 420. Roll unit 422 may be connected with unassigned grant 412 by an "authorized edge," to create assigned grant 410.

Figure 5:
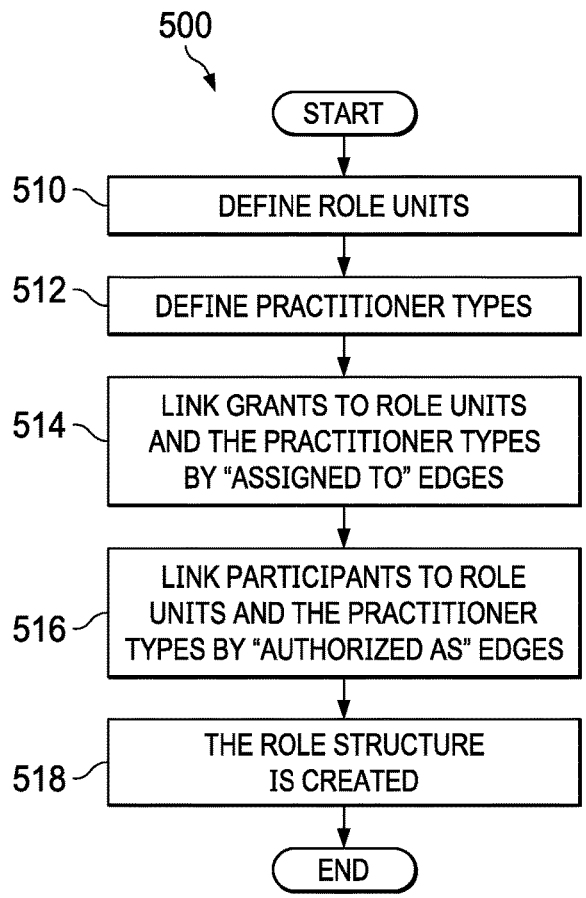
FIG. 5 is an illustration of a flowchart of a process for creating a role structure defining practitioner types in a data processing system in accordance with an illustrative embodiment.

FIG. 5 is an illustration of a flowchart of a process for creating a role structure defining practitioner types in a data processing system depicted in accordance with an illustrative embodiment. Process 500 begins by defining role units (step 510). Practitioner types are defined (step 512). Grants are linked to role units and the practitioner types by "assigned to" edges (step 514). Participants are linked to role units and the practitioner types by "authorized as" edges (step 516). The role structure is created (step 518).

Figure 6:
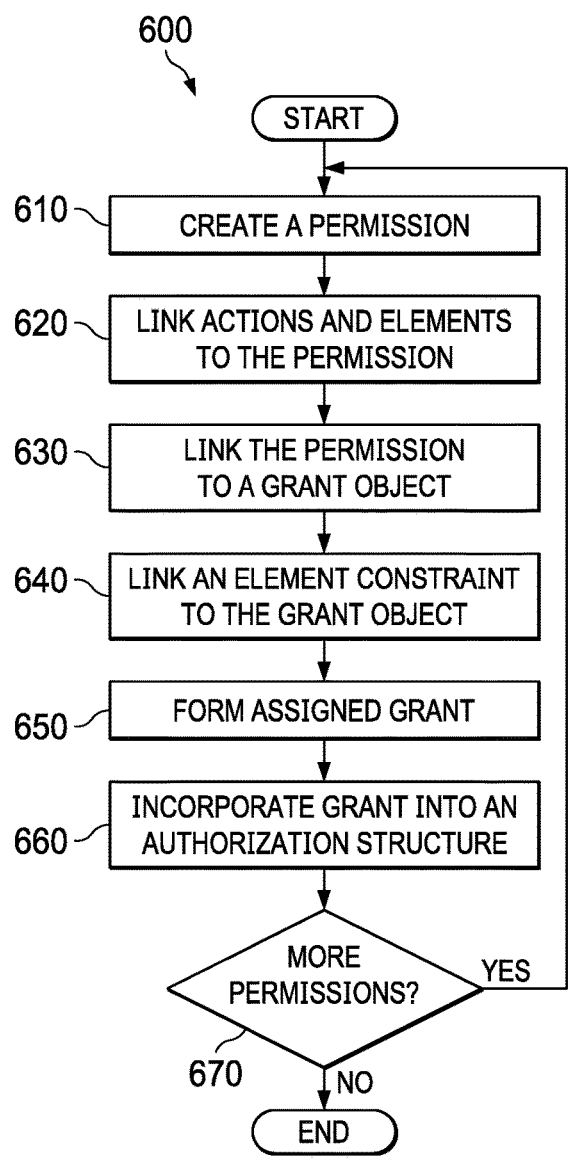
FIG. 6 is an illustration of a flowchart of a process for creating an authorization policy structure in a data processing system in accordance with an illustrative embodiment.

FIG. 6 is an illustration of a flowchart of a process for creating an authorization policy structure in a data processing system depicted in accordance with an illustrative embodiment. Process 600 starts by creating a permission (step 610). Actions and elements are linked to the permission by "belongs to" edges (step 620). The permission is linked to an unassigned grant by "belongs to" edges (step 630). An element constraint is linked to the unassigned grant by a "manages type" edge (step 640). The assigned grant is formed from an unassigned grant and the participants, connected to the assigned grant by an "authorized as" edge (step 650). The grant node is incorporated into an authorization structure (step 660). A determination is made whether there is another permission node to create (step 670). If so, process 600 goes to step 610, and if not, process 600 ends.

Figure 7:
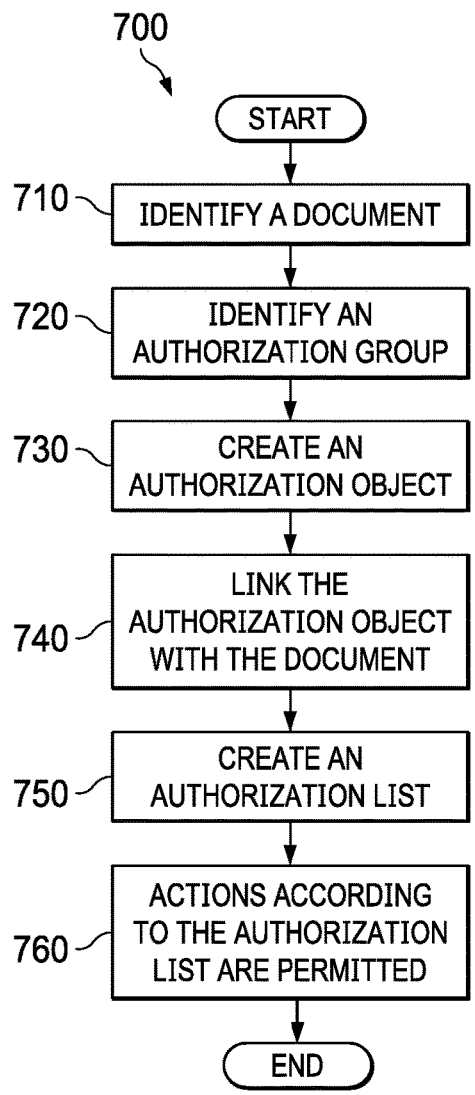
FIG. 7 is an illustration of a flowchart of a process for controlling access to a document with a list formed from an authorization object linked with the document in a data processing system in accordance with an illustrative embodiment.

FIG. 7 is an illustration of a flowchart of a process for controlling access to documents with a list formed from an authorization object linked with the document in a data processing system depicted in accordance with an illustrative embodiment. Process 700 starts by identifying a document (710). The document may be a document that has not been assigned an authorization object to control authorized access of the document. Authorization groups that have a need to perform actions on the document are identified (step 720). An authorization object is created for the document by linking an authorization group to at least one grant (step 730). The authorization object is linked with the document (step 740). The authorization object is used to create a list of actors and their respective authorized actions for the document. The list comprises all participants connected to the authorization groups and at least one grant by the permission-based units (step 750). Actions on the document are permitted according to the list (step 760). Process 700 terminates thereafter.

Figure 8:
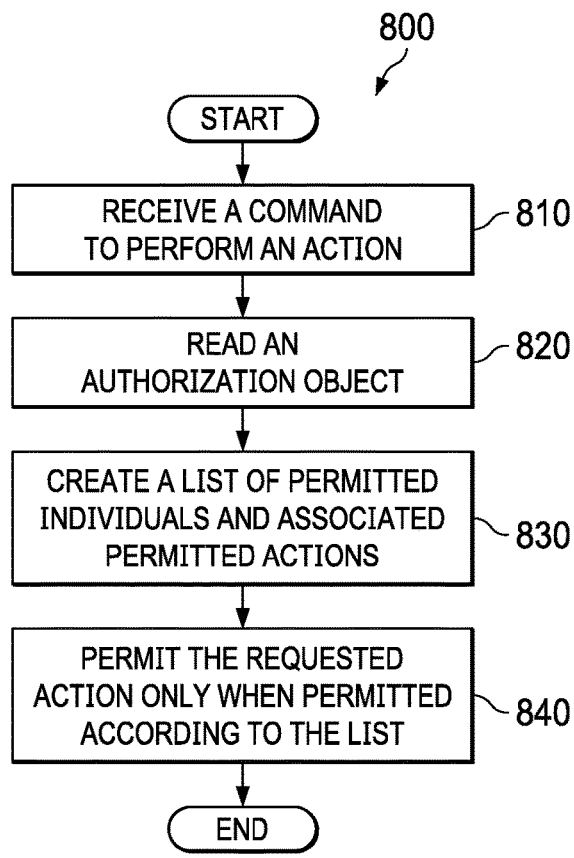
FIG. 8 is an illustration of a flowchart of a process for accessing a document with a list formed from an authorization object linked with the document in a data processing system in accordance with an illustrative embodiment.

FIG. 8 is an illustration of a flowchart of a process for accessing a document with a list formed from an authorization object linked with the document in a data processing system depicted in accordance with an illustrative embodiment. Process 800 may be a computer-implemented method of improving data access control in an organization by a computer. Process 800 starts by receiving, by a computer, a command to perform an action on a document (Step 810). Responsive to receiving the command, the computer reads an authorization object assigned to the document (Step 820). Responsive to reading the authorization object, the computer creates a list of permitted individuals and the associated permitted actions in accordance with the authorization object (step 830). Responsive to creating the list, the computer permits the requested action for the document only if the actor and the requested action is permitted according to the list (step 840). The process terminates thereafter.

Figure 9:
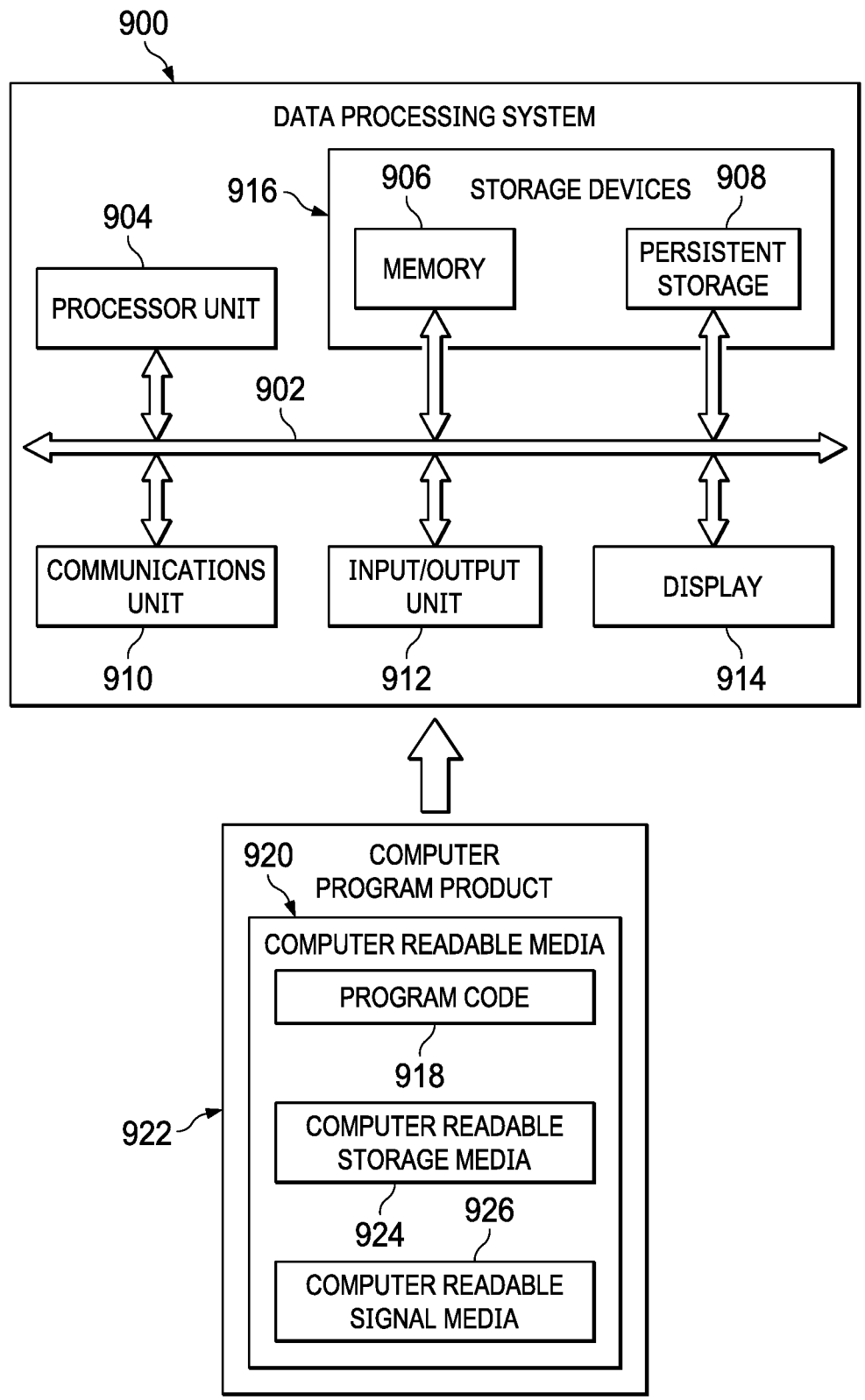
FIG. 9 is an illustration of a block diagram of a data processing system in accordance with an illustrative embodiment.

FIG. 9 is an illustration of a block diagram of a data processing system depicted in accordance with an illustrative embodiment. Data processing system 900 is an example of a computer as described with respect to FIG. 1 through FIG. 4.

In this illustrative example, data processing system 900 includes communications framework 902, which provides communications between processor unit 904, memory 906, persistent storage 908, communications unit 910, input/ output unit 912, and display 914. In this example, communication framework 902 may take the form of a bus system.

Processor unit 904 serves to execute instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these illustrative examples. In one example, computer readable media 920 may be computer readable storage media 924 or computer readable signal media 926.

In these illustrative examples, computer readable storage media 924 is a physical or tangible storage device used to store program code 918 rather than a medium that propagates or transmits program code 918.

Alternatively, program code 918 may be transferred to data processing system 900 using computer readable signal media 926. Computer readable signal media 926 may be, for example, a propagated data signal containing program code 918. For example, computer readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components, in addition to or in place of those illustrated for data processing system 900. Other components shown in FIG. 9 can be varied from the illustrative examples shown. The different embodiments may be implemented using any hardware device or system capable of running program code 918.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Many modifications and variations will be apparent to those of ordinary skill in the art. Further, different illustrative embodiments may provide different features, as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of improving data access in an organization by a computer, the method comprising:
   receiving, by the computer, a command from an individual to perform an action on a data element to the organization;
   responsive to receiving the command, reading an authorization object assigned to the data element;
   responsive to reading the authorization object, creating a list of individuals authorized to perform the action on the data element in accordance with the authorization object;

responsive to creating the list, permitting the action, by the computer, on the data element only if the individual is on the list;

periodically traversing, by the computer, a structure for changes to authorization objects assigned to documents, and automatically updating a changed authorization object by linking the changed authorization object with at least one authorization grant and linking the changed authorization object with a document and deleting an old authorization object;

storing, by the computer, a document as part of an authorization structure that links the document with the changed authorization object to define one or more practitioner types, one or more permissions, and one or more element constraints; and creating a flexible graph database having a number of practitioner groups connected by a number of responsibility grants to a number of permissions and element constraints.

2. The computer-implemented method of claim 1, wherein reading the authorization object assigned to a document further comprises identifying one or more permissions of an authorization grant.

3. The computer-implemented method of claim 1, wherein creating the flexible graph database further comprises:
defining practitioner types by type designations connected by a number of edges to a number of positions and to a number of authorization grants.

4. The computer-implemented method of claim 3, wherein a first edge connecting a first type designation to a position is "authorized as."

5. The computer-implemented method of claim 4, wherein a second edge connecting the first type designation to a first authorization grant is "assigned to."

6. The computer-implemented method of claim 3, wherein the permission comprises a node connected to a position by a "manages" edge.

7. The computer-implemented method of claim 3, wherein the permission comprises a node connected to a roll unit by a "belongs to" edge.

8. The computer-implemented method of claim 1 further comprising:
creating the authorization object for a document on an interface that allows linking a role unit to at least one grant and at least one element constraint.

9. A computer system comprising:
a hardware processor; and
a graph database system in communication with the hardware processor, wherein the graph database system:
receives a command from an individual to perform an action on a data element to an organization;
responsive to receiving the command, reads an authorization object assigned to the data element;
responsive to reading the authorization object, creates a list of individuals authorized to perform the action on the data element in accordance with the authorization object; and
responsive to creating the list, permits the action, by the computer, on the data element only if the individual is on the list,
wherein the graph database system further:
periodically traverses a structure for changes to authorization objects assigned to documents, and automatically updates a changed authorization object by linking the changed authorization object with at least one authorization grant and linking the changed authorization object with a document and deleting an old authorization object;
stores a document as part of an authorization structure that links the document with the changed authorization object to define one or more practitioner types, one or more permissions, and one or more element constraints; and
creates a flexible graph database having a number of practitioner groups connected by a number of responsibility grants to a number of permissions and element constraints.

10. The computer system of claim 9, wherein reading the authorization object assigned to a document further comprises identifying one or more permissions of an authorization grant.

11. The computer system of claim 9, wherein creating the flexible graph database further comprises:
defining practitioner types by type designations connected by a number of edges to a number of positions and to a number of authorization grants.

12. The computer system of claim 11, wherein a first edge connecting a first type designation to a position is "authorized as."

13. The computer system of claim 12, wherein a second edge connecting the first type designation to a first authorization grant is "assigned to."

14. The computer system of claim 11, wherein the permission comprises a node connected to a position by a "manages" edge.

15. The computer system of claim 11, wherein the permission comprises a node connected to a roll unit by a "belongs to" edge.

16. The computer system of claim 9, wherein the graph database system further:
creates the authorization object for a document on an interface that allows linking a role unit to at least one grant and at least one element constraint.

17. A computer program product for improved data access in an organization by a computer, the computer program product comprising:
a computer readable storage media;
program code, stored on a non-transitory computer readable storage media, for receiving a command from an individual to perform an action on a data element to the organization;
program code, stored on the non-transitory computer readable storage media, for reading an authorization object assigned to the data element in response to receiving the command;
program code, stored on the non-transitory computer readable storage media, for creating a list of individuals authorized to perform the action on the data element in accordance with the authorization object in response to reading the authorization object;
program code, stored on the non-transitory computer readable storage media, for permitting the action on the data element only if the individual is on the list;
program code, stored on the non-transitory computer readable storage media, for periodically traversing, a structure for changes to authorization objects assigned to documents, and automatically updating a changed authorization object by linking the changed authorization object with at least one authorization grant and linking the changed authorization object with a document and deleting an old authorization object;

program code, stored on the non-transitory computer readable storage media, for storing a document as part of an authorization structure that links the document with the changed authorization object to define one or more practitioner types, one or more permissions, and one or more element constraints; and program code, stored on the non-transitory computer readable storage media, for creating a flexible graph database having a number of practitioner groups connected by a number of responsibility grants to a number of permissions and element constraints.

18. The computer program product of claim 17, wherein reading the authorization object further comprises identifying one or more permissions of an authorization grant.

19. The computer program product of claim 17, wherein the program code for creating the flexible graph database further comprises:

program code, stored on the non-transitory computer readable storage media, for defining practitioner types by type designations connected by a number of edges to a number of positions and to a number of authorization grants.

20. The computer program product of claim 19, wherein a first edge connecting a first type designation to a position is "authorized as."

21. The computer program product of claim 20, wherein a second edge connecting the first type designation to a first authorization grant is "assigned to."

22. The computer program product of claim 19, wherein the permission comprises a node connected to a position by a "manages" edge.

23. The computer program product of claim 19, wherein the permission comprises a node connected to a roll unit by a "belongs to" edge.

24. The computer program product of claim 17 further comprising:

program code, stored on the non-transitory computer readable storage media, for creating the authorization object for a document on an interface that allows linking a role unit to at least one grant and at least one element constraint.

* * * * *